(12) United States Patent
Sano et al.

(10) Patent No.: US 8,096,269 B2
(45) Date of Patent: Jan. 17, 2012

(54) ENGINE SYSTEM

(75) Inventors: Tadashi Sano, Ushiku (JP); Takao Ishikawa, Hitachi (JP); Atsushi Shimada, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 364 days.

(21) Appl. No.: 12/411,489

(22) Filed: Mar. 26, 2009

(65) Prior Publication Data

US 2009/0241861 A1 Oct. 1, 2009

(30) Foreign Application Priority Data

Mar. 28, 2008 (JP) ................................. 2008-087347

(51) Int. Cl.
F02B 43/08 (2006.01)
(52) U.S. Cl. ..................................... 123/3; 123/DIG. 12
(58) Field of Classification Search ....... 123/3, DIG. 12; 165/146
See application file for complete search history.

(56) References Cited

U.S. PATENT DOCUMENTS

| | | | |
|---|---|---|---|
| 4,418,653 A | 12/1983 | Yoon | |
| 6,155,212 A | 12/2000 | McAlister | |
| 7,448,348 B2 * | 11/2008 | Shinagawa et al. | 123/3 |
| 7,654,232 B2 * | 2/2010 | Ishimaru et al. | 123/3 |
| 7,891,415 B2 * | 2/2011 | Ushio et al. | 165/146 |
| 2008/0202449 A1 | 8/2008 | Shimada et al. | |
| 2009/0000575 A1 | 1/2009 | Shiamada et al. | |

FOREIGN PATENT DOCUMENTS

| | | |
|---|---|---|
| DE | 34 13 508 A1 | 4/1985 |
| JP | 2002-339772 | 11/2002 |
| JP | 2005-147124 | 6/2005 |
| JP | 2005-299499 | 10/2005 |
| JP | 2006-248814 | 9/2006 |
| JP | 2007-239671 | 9/2007 |
| JP | 2008-088922 | 4/2008 |

OTHER PUBLICATIONS

Office Action in English of EP 09004384.5 dated Jul. 9, 2009.

* cited by examiner

*Primary Examiner* — Noah Kamen
(74) *Attorney, Agent, or Firm* — Antonelli, Terry, Stout & Kraus, LLP.

(57) ABSTRACT

It is an object of the invention to provide an engine system using a small-sized heat exchanger having a high efficiency and a stable performance for heating and vaporizing a hydrogen medium supplied to a reactor vessel. The engine system includes an engine having an intake pipe for taking in air for combustion thereinto and an exhaust pipe for exhausting exhaust gas therefrom, a reactor vessel with a catalyst supported therein for decomposing a hydrogen medium which contains hydrogen in molecules thereof and of which the hydrogen can be taken out by a chemical reaction, a hydrogen medium tank storing the hydrogen medium, a high-pressure pump for pressurizing and transporting the hydrogen medium, a first heat exchanger for exchanging heat with the hydrogen medium in a liquid state, a second heat exchanger for exchanging heat with the hydrogen medium in a gas state, and a back pressure valve for depressurizing and vaporizing the hydrogen medium, disposed in a hydrogen medium flow path between the first heat exchanger and the second heat exchanger, wherein the reactor vessel is disposed in the exhaust pipe so that the reactor vessel can exchange heat with the exhaust pipe, and wherein the high-pressure pump, the first heat exchanger, and the second heat exchanger are arranged in the hydrogen medium flow path for transporting the hydrogen medium from the hydrogen medium tank to the reactor vessel in this order from an upstream side in the hydrogen medium flow path.

20 Claims, 4 Drawing Sheets

ENGINE SYSTEM

CLAIM OF PRIORITY

The present application claims priority from Japanese patent application serial No. 2008-087347, filed on Mar. 28, 2008, the content of which is hereby incorporated by reference into this application.

BACKGROUND OF THE INVENTION

1. Field of the Invention

The present invention relates to an engine system.

2. Description of Related Art

Since automobiles using a gasoline as a fuel emit carbon dioxide ($CO_2$), hydrogen has attracted attention as an alternative fuel. However, hydrogen is a flammable substance and has a high explosibility and caution is required when hydrogen is stored or reserved.

Prior arts for solving this problem are disclosed in Document 1 (Japanese Patent Laid-open No 2005-299499) and Document 2 (Japanese Patent Laid-open No 2005-147124). Documents 1 and 2 disclose means for reserving hydrogen as a hydrogenated fuel and taking out hydrogen gas utilizing a chemical reaction and supplying the hydrogen gas to an automobile when the hydrogen is required.

Document 1 discloses a hydrogen-used internal combustion engine for enhancing a reaction efficiency to increase a quantity of produced hydrogen when a dehydrogenation reaction is caused utilizing energy of exhaust gas and for simply constructing a mechanism for causing the dehydrogenation reaction. The hydrogen-used internal combustion engine includes a casing which is disposed inside an exhaust passage of the internal combustion engine and an end of which is disposed outside the exhaust passage, a catalyst disposed in the casing, a fuel supplying means for supplying a fuel containing an organic hydride, and a hydrogen supplying means for supplying the internal combustion engine with hydrogen taken out of the fuel containing the organic hydride by the dehydrogenation reaction on the catalyst.

Document 2 discloses a hydrogen-used internal combustion engine for providing a system in which one or two or more kinds of fuel can be freely selected and supplied. This hydrogen-used internal combustion engine is supplied with one or more kinds of fuel selected from a group of a hydrogenated fuel, a dehydrogenation product obtained by dehydrogenating the hydrogenated fuel and hydrogen, and is thereby operated. The hydrogen-used internal combustion engine includes a hydrogenated fuel reservoir portion, a reacting means for causing dehydrogenation reaction, a separating means for separating hydrogen-rich gas from a dehydrogenation product, and a dehydrogenation product reservoir portion for reserving a dehydrogenation product.

Documents 1 and 2 disclose that the hydrogenated fuel is poured into a reactor vessel containing a catalyst to obtain hydrogen. Since the dehydrogenation reaction of the hydrogenated fuel used here is an endothermic reaction, it is required to supply heat to the reactor vessel. In general, heat of the exhaust gas from the engine is utilized.

A possible method for reducing a volume of the reactor vessel is such that a hydrogen medium is heated to a reaction temperature and vaporized using a vaporizer and then supplied to the reactor vessel.

However, this method involves a problem. The operating state of the engine constantly varies and thus an amount of supplied heat is varied. At this time, a boiling position of the hydrogen medium in the vaporizer is constantly shifted forward and backward. Therefore, it is difficult to fix a shape of a hydrogen medium flow path in the vaporizer either for gas or for liquid and there is no other choice but to use an inefficient heat exchanger both for gas and for liquid.

It is an object of the present invention to provide an engine system using a small-sized heat exchanger having a high efficiency and a stable performance for heating and vaporizing the hydrogen medium supplied to the reactor vessel.

SUMMARY OF THE INVENTION

The engine system includes an engine having an intake pipe for taking in air for combustion thereinto and an exhaust pipe for exhausting an exhaust gas therefrom, a reactor vessel with a catalyst supported therein for decomposing a hydrogen medium which contains hydrogen in molecules thereof and of which the hydrogen can be taken out by a chemical reaction, a hydrogen medium tank storing the hydrogen medium, a high-pressure pump for pressurizing and transporting the hydrogen medium, a first heat exchanger for exchanging heat with the hydrogen medium in a liquid state, a second heat exchanger for exchanging heat with the hydrogen medium in a gas state, and a back pressure valve for depressurizing and vaporizing the hydrogen medium, disposed in a hydrogen medium flow path between the first heat exchanger and the second heat exchanger, wherein the reactor vessel is disposed in the exhaust pipe so that the reactor vessel can exchange heat with the exhaust pipe, and wherein the high-pressure pump, the first heat exchanger, and the second heat exchanger are arranged in the hydrogen medium flow path for transporting the hydrogen medium from the hydrogen medium tank to the reactor vessel in this order from an upstream side in the hydrogen medium flow path.

According to the present invention, the boiling position of a liquid fuel can be fixed and thus the phase of the hydrogen medium flowing through the heat exchanger can be controlled.

Further, according to the present invention, it is possible to design a structure of a highly efficient heat exchanger appropriate to each phase of the fuel and provide an engine system having a heat exchanger small in size and stable in performance.

DETAILED DESCRIPTION OF THE PREFERRED EMBODIMENTS

Figure 1:
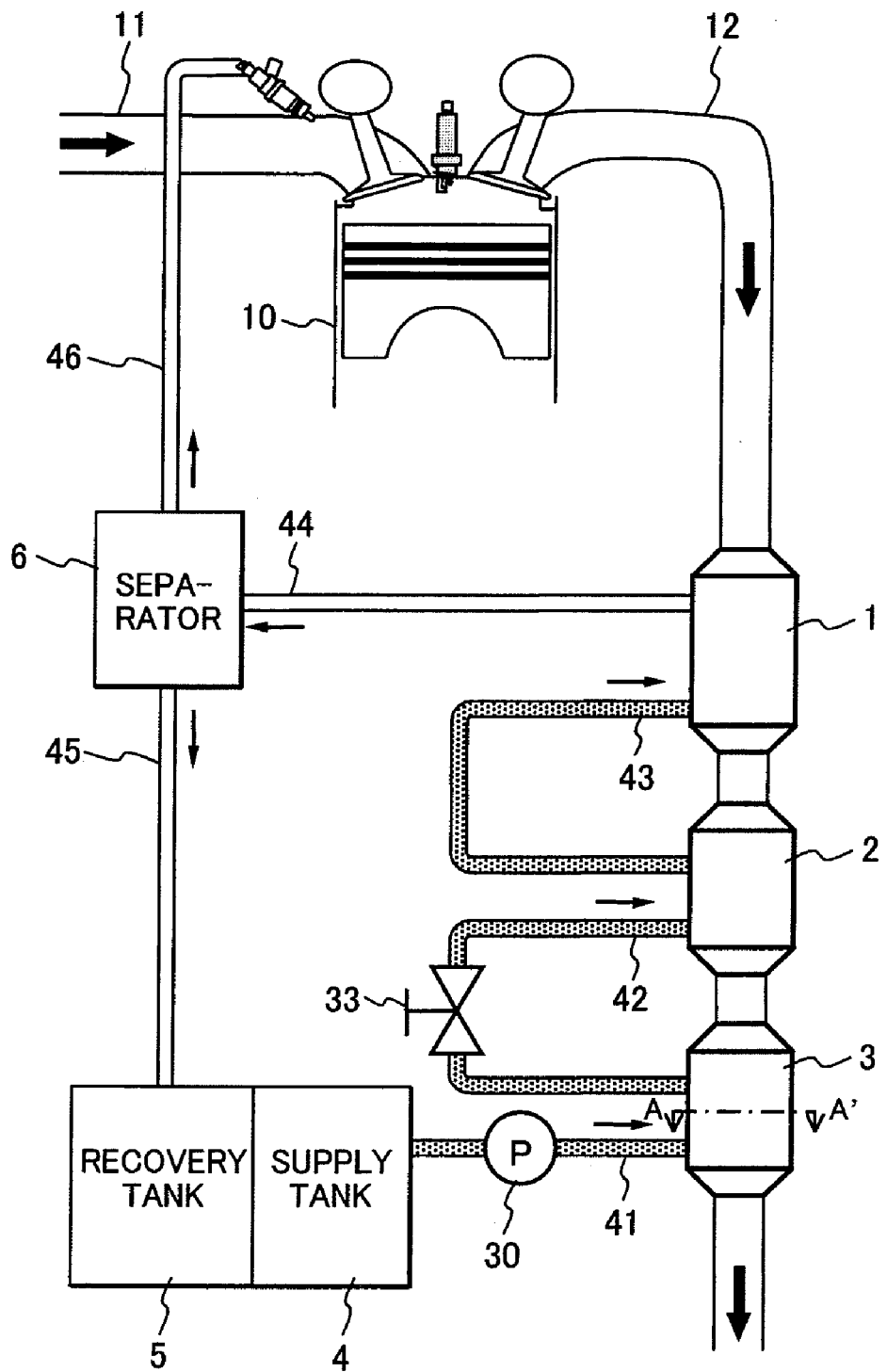
FIG. 1 is a schematic block diagram illustrating an engine system in an embodiment of the present invention.

The present invention relates to an engine system and a method for operating the same and in particular to the engine system including a reactor vessel for producing hydrogen from an organic compound by a dehydrogenation reaction and a method for operating the same.

The engine system according to a first aspect of the present invention uses, as fuel, hydrogen produced by the following procedure or a mixture of the produced hydrogen and a hydrogen medium: the hydrogen medium which contains hydrogen in its molecules and from which hydrogen can be taken out by a chemical reaction is decomposed in the reactor vessel with a catalyst supported therein utilizing an exhaust heat of an engine. The engine system includes an exhaust pipe for exhausting an exhaust gas from the engine and the reactor vessel that is installed at some midpoint in the exhaust pipe and is supplied with heat by exchanging heat with the exhaust gas. The engine system is characterized in that at least two heat exchangers for exchanging heat between the hydrogen medium and the exhaust gas are installed in a hydrogen medium flow path for transporting liquid (the hydrogen medium) from a hydrogen medium tank to the reactor vessel using a high-pressure pump, and a back pressure valve is arranged in the hydrogen medium flow path disposed between the two heat exchangers.

The engine system according to a second aspect of the present invention uses, as fuel, hydrogen produced by the following procedure or a mixture of the produced hydrogen and a hydrogen medium: the hydrogen medium which contains hydrogen in its molecules and from which hydrogen can be taken out by the chemical reaction is decomposed in the reactor vessel with the catalyst supported therein utilizing the exhaust heat of the engine. The engine system includes an exhaust pipe for transporting the exhaust gas from the engine and the reactor vessel that is installed at some midpoint in the exhaust pipe and is supplied with heat by exchanging heat with the exhaust gas. The engine system is characterized in that at least two heat exchangers for heat exchange between the hydrogen medium and a reacted hydrogen medium (a hydrogen medium after a reaction) are installed in a hydrogen medium flow path for transporting a hydrogen medium from a hydrogen medium tank to the reactor vessel using a high-pressure pump, and a back pressure valve is arranged in the hydrogen medium flow path disposed between the two heat exchangers.

The engine system according to a third aspect of the present invention uses, as fuel, hydrogen produced by the following procedure or a mixture of the produced hydrogen and a hydrogen medium: the hydrogen medium which contains hydrogen in its molecules and from which hydrogen can be taken out by the chemical reaction is decomposed in the reactor vessel with the catalyst supported therein utilizing the exhaust heat of the engine. The engine system includes an exhaust pipe for transporting exhaust gas from the engine and the reactor vessel that is installed at some midpoint in the exhaust pipe and is supplied with heat by exchanging heat with the exhaust gas. The engine system is characterized in that at least one heat exchanger for exchanging heat between the hydrogen medium and the reacted hydrogen medium and at least one heat exchanger for exchanging heat between the hydrogen medium and the exhaust gas are installed in the hydrogen medium flow path for transporting the hydrogen medium from the hydrogen medium tank to the reactor vessel using a high-pressure pump; and a back pressure valve is arranged in the hydrogen medium flow path disposed between the two heat exchangers.

The engine system according to a fourth aspect of the present invention is characterized in that multiple hydrogen medium flow paths are disposed in parallel in at least one heat exchanger.

The engine system according to a fifth aspect of the present invention is characterized in that multiple exhaust gas flow paths are disposed in parallel in at least one heat exchanger.

The engine system according to a sixth aspect of the present invention is characterized in that the following is implemented with respect to the two heat exchangers: a sectional area of a hydrogen medium flow path in the heat exchanger arranged on an upstream side as viewed from the hydrogen medium flow path is larger than a sectional area of a hydrogen medium flow path in the heat exchanger arranged on a downstream side.

The engine system according to a seventh aspect of the present invention is characterized in that the following is implemented with respect to the two heat exchangers: the sectional area of the hydrogen medium flow path in the heat exchanger provided on the upstream side as viewed from the hydrogen medium flow path is not more than 1 mm$^2$.

The engine system according to an eighth aspect of the present invention is characterized in that an opening pressure of the back pressure valve is fixed to a value higher by 10% than a saturated vapor pressure of a fluid to be heated (a hydrogen medium) at a target temperature.

Hereafter, description will be given to embodiments with reference to the drawings.

First Embodiment

FIG. 1 is a schematic block diagram illustrating an engine system in an embodiment of the present invention. The engine system illustrated in the drawing includes an engine 10 that uses a hydrogen medium as fuel. The engine 10 is connected with an intake pipe 11 and an exhaust pipe 12 and a reactor vessel 1, a second heat exchanger 2, and a first heat exchanger 3 are arranged in the exhaust pipe in this order from an upstream side in the exhaust pipe.

The above hydrogen medium includes all the substances that contain hydrogen in their molecules and from which hydrogen can be released by chemical reaction. Such substances include hydrocarbon fuels, including a gasoline, a light oil, a coal oil, a heavy oil, decalin, cyclohexane, methylcyclohexane, naphthalene, benzene, and toluene, and their composite fuels, hydrogen peroxide, ammonia, and the like. Hereafter, a medium including hydrogen in its molecules will be referred to as a hydrogenated medium and a medium that released hydrogen by chemical reaction will be referred to as a dehydrogenated medium.

The hydrogenated medium as a liquid fuel is pressurized by a pump 30 (a high-pressure pump) and is supplied from a supply tank 4 (a hydrogen medium tank) to the first heat exchanger 3 through a pipe 41. The hydrogenated medium is heated at the first heat exchanger 3 by exhaust gas supplied through the exhaust pipe 12. Thereafter, it goes through a pipe 42, the second heat exchanger 2, a pipe 43, and the reactor vessel 1 and part of it is turned into the dehydrogenated medium. It then goes through a pipe 44 and arrives at a separator 6. A back pressure valve 33 is arranged in the pipe 42 connecting to the second heat exchanger 2.

The pressure of the back pressure valve 33 is fixed to a value equal to or higher than a saturated vapor pressure of the liquid fuel. Therefore, the liquid fuel remains in a liquid state in the first heat exchanger 3 even though it is heated to a temperature equal to or higher than its boiling point. When a liquid fuel in a high-temperature and high-pressure state passes through the back pressure valve 33, it is depressurized and turned into a fuel gas (a gas state). At this time, it has evaporative latent heat drawn and falls in temperature. The fuel gas with reduced temperature is heated again at the second heat exchanger 2 by the exhaust gas supplied through the exhaust pipe 12 and is supplied to the reactor vessel 1 through the pipe 43.

The fuel gas (the hydrogenated medium) is brought into contact with the catalyst heated by the exhaust gas supplied through the exhaust pipe 12 and brought into a high-temperature state in the reactor vessel 1. As a result, a part of the fuel gas is decomposed and turned into the hydrogen gas and the dehydrogenated medium. The pipes 41, 42, 43 may be referred to as hydrogen medium flow paths.

The mixture of the hydrogenated medium, hydrogen gas, and dehydrogenated medium goes through the pipe 44 and separated into hydrogen as gas and the fuel in the liquid state at normal temperature at the separator 6 having a cooling structure. For this cooling structure, for example, such a structure as to accelerate heat dissipation, for example, the arrangement of a fin on an outer wall is desirable. The separated liquid fuel goes through a pipe 45 and is reserved in a recovery tank 5. Meanwhile, the separated hydrogen goes through a pipe 46 and is supplied into the intake pipe 11 or a cylinder in the engine 10.

Hydrogen burned in the engine 10 is turned into an exhaust gas having a high temperature and is supplied as a heat source to the reactor vessel 1 through the exhaust pipe 12. It goes through the second heat exchanger 2 and the first heat exchanger 3 and is released to the air. The fuel supplied to the engine at this time may be only hydrogen or a hydrogenated medium before or after reaction may be supplied through a separate system and used as a composite fuel. The pipe 44 may be referred to as dehydrogenated medium flow path.

Figure 4:
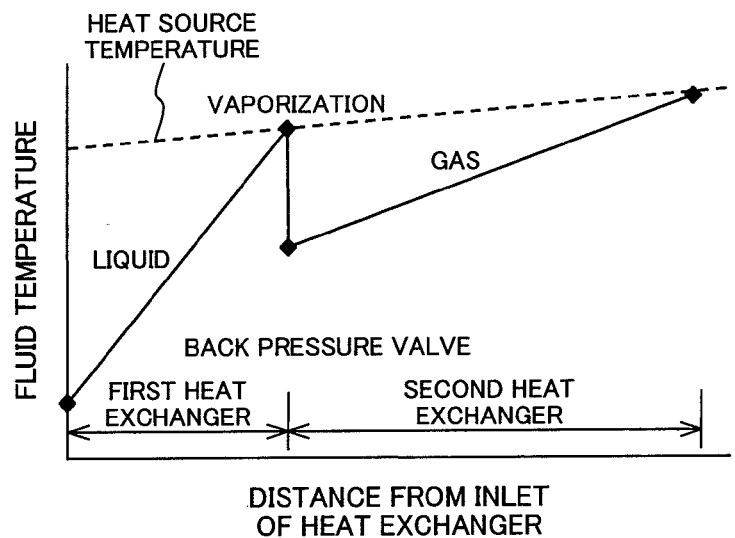
FIG. 4 is a graph schematically indicating a relation between a distance from an inlet of a heat exchanger and an average temperature of a fuel flow path in the present invention.
Figure 5:
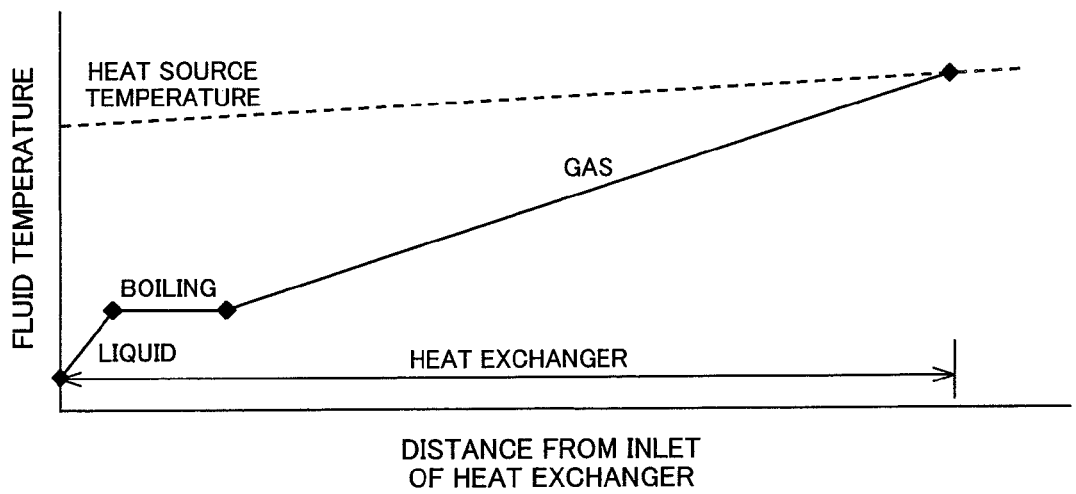
FIG. 5 is a graph schematically indicating a relation between a distance from an inlet of a heat exchanger and an average temperature of a fuel flow path in a prior art.

FIG. 4 is a graph schematically indicating a relation between a distance from an inlet of a heat exchanger and an average temperature of a fuel flow path in the present invention. FIG. 5 is a graph schematically indicating a relation between a distance from an inlet of a heat exchanger and an average temperature of a fuel flow path in a prior art. A horizontal axis is taken as a distance from an inlet of a heat exchanger in the hydrogen medium flow path and a vertical axis is taken as a temperature of a hydrogen medium (a fluid temperature).

In the prior art illustrated in FIG. 5, the hydrogen medium is heated to its boiling point in a liquid state and it is heated in a gas state after it is boiled and it reaches a target temperature. Meanwhile, the present invention illustrated in FIG. 4 is so constructed that the following is implemented: the hydrogen medium is heated close to the target temperature in a liquid state at the first heat exchanger 3, and it is vaporized at the back pressure valve 33 and falls in temperature and then it is heated in a gas state at the second heat exchanger 2 by an amount equivalent to the evaporative latent heat. In the present invention, therefore, an amount of heat exchange in the liquid state in which its coefficient of thermal conductivity is increased can be increased as compared with the prior art. Consequently, it is possible to reduce a required volume of a gas heat exchanger that is apt to be larger in size than a liquid heat exchanger.

A difference between the above-mentioned second heat exchanger 2 and first heat exchanger 3 is a difference in a phase state of the hydrogen medium in the heat exchangers. When the phase state of the fluid (the hydrogen medium) flowing into a heat exchanger is known, a heat exchanger suitable for each phase can be designed. If the back pressure valve 33 is not installed, the following takes place when the amount of heat from the exhaust gas varies: a boiling position fluctuates and thus the phase state of the fluid flowing through a heat exchanger in a specific position becomes unknown. For this reason, when the pressure loss of a heat exchanger is limited, it is required to form it in such a shape that it can accommodate whichever cubically expanded gas or liquid passes through it. Since liquid and gas are different in the coefficient of thermal conductivity, a pipe diameter most appropriate to a heat exchanger differs. It is nevertheless difficult to select the most appropriate pipe diameter because of the above-mentioned reason.

According to the present invention, meanwhile, the boiling position can be fixed by the back pressure valve 33. Therefore, it is possible to design a heat exchanger for liquid on an upstream side of the back pressure valve and for gas on a downstream side and a size reduction can be implemented by an optimization. In cases where the opening pressure of the back pressure valve 33 at this time is equal to the saturated vapor pressure of the liquid at a target heating temperature, it is boiled when the amount of heat supplied form a heat source is increased. Therefore, it is desirable to make the fixed pressure of the back pressure valve 33 higher by 10% or more than the saturate vapor pressure. It is more desirable to make the fixed pressure of the back pressure valve 33 higher by 50% or more than the saturated vapor pressure.

Because the liquid is higher in the coefficient of thermal conductivity than gas in the liquid state, it is possible to set the contact surface area of the heat exchanger small. That is, the volume of the heat exchanger can be reduced. When the coefficient of thermal conductivity is high, an amount of heat transferred per unit area is increased and thus it is possible to shorten a heating time which is required until the target temperature is reached.

In cases where the back pressure valve 33 is not arranged and the boiling position fluctuates, the fuel flows downstream in the liquid state when an amount of supplied heat becomes insufficient. If the amount of supplied heat is abruptly increased at the next instant, boiling occurs in an upstream area and liquid existing in a downstream area is rapidly pushed away by produced gas. In this case, a rapid increase of the pressure occurs and there is a possibility that a structure in contact with the fuel will be seriously damaged.

In cases where the back pressure valve 33 is arranged, meanwhile, the boiling position is fixed and thus the above-mentioned bumping does not occur. In cases where the amount of supplied heat is excessive or deficient, the following takes place. When the amount of supplied heat is too large, the temperature of pressurized liquid rises and as a result, the temperature of gas discharged from the back pressure valve 33 rises. The pressure of the back pressure valve can be set to a value higher by, for example, 10% or so than the saturated vapor pressure of the hydrogen medium in the first heat exchanger 3 at an assumed maximum temperature. In this case, the hydrogen medium does not boil in the first heat exchanger 3 even though the amount of supplied heat is slightly too large and it is possible to exchange heat with a high coefficient of thermal conductivity maintained.

In cases where the amount of supplied heat is excessive and the saturated vapor pressure exceeds the set pressure of the back pressure valve 33, the hydrogen medium in the first heat exchanger 3 partly boils and the coefficient of thermal conductivity is lowered. Since a heat exchange has already occurred beyond a scope of an assumption, however, an assumed heat exchange performance is not missed. Since what gushes out of the back pressure valve 33 is gas, such a problem as a damage to the heat exchanger does not arise.

When the pressure of the back pressure valve 33 is set to a value higher by 50% or so than the saturated vapor pressure of the hydrogen medium in the first heat exchanger 3 at the assumed maximum temperature, the following can be implemented: even though the amount of the supplied heat becomes excessive, a possibility of boiling in the first heat exchanger 3 is significantly reduced. At the first heat exchanger 3, in this case, it is possible to exchange heat with the hydrogen medium in the liquid state and the high coefficient of thermal conductivity maintained.

As mentioned above, only the temperature of gas gushing out of the downstream side of the back pressure valve 33 changes under any condition. The second heat exchanger 2 and the first heat exchanger 3 can respectively fulfill their functions intended as a heat exchanger for gas and a heat exchanger for liquid.

Figure 2:
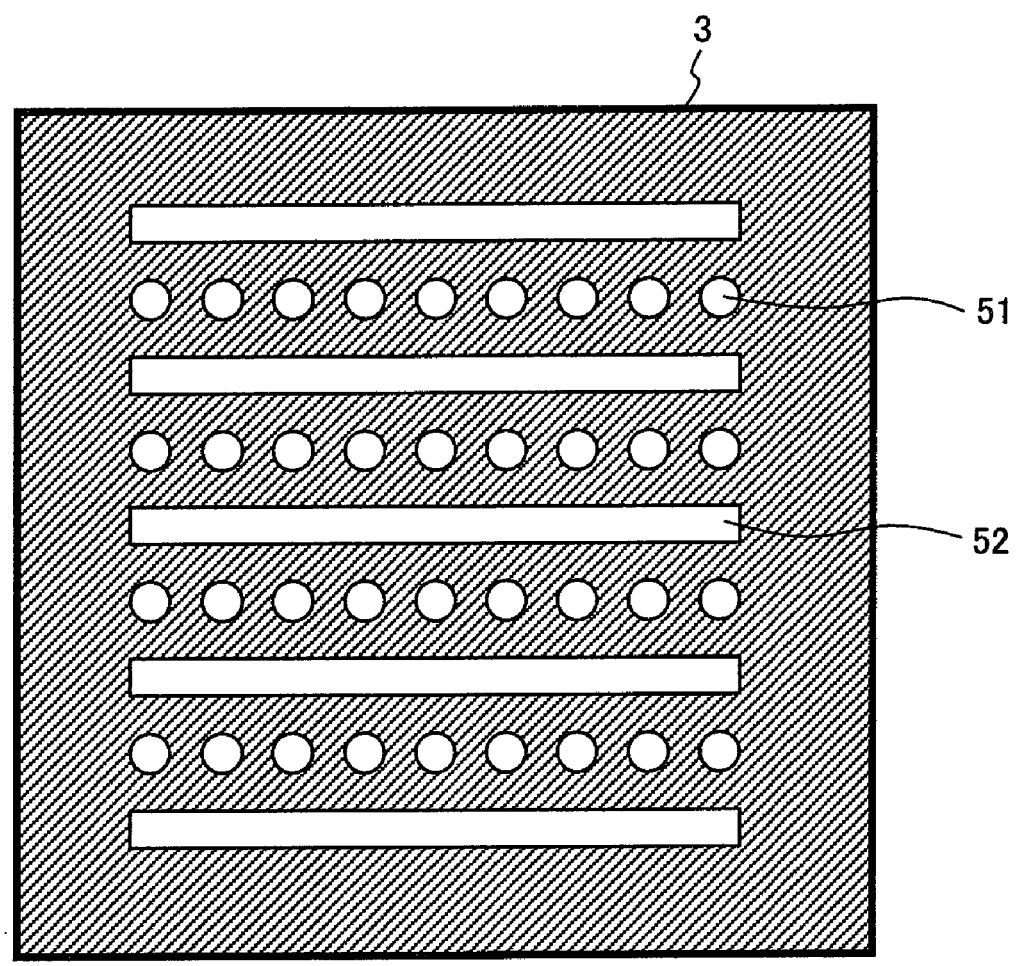
FIG. 2 is a sectional view of a heat exchanger taken along line A-A' of FIG. 1.

FIG. 2 is a sectional view of a heat exchanger taken along line A-A' of FIG. 1 and an embodiment of a partially enlarged sectional view of a heat exchanger perpendicular to a direction of flow. The heat exchanger contains a plurality of narrow hydrogen medium paths 51 (these can be called narrow fuel paths) and a plurality of narrow exhaust gas paths 52 (these can be called narrow exhaust gas paths) therein, and the narrow hydrogen medium paths 51 are disposed in parallel and the narrow exhaust gas paths 52 are disposed in parallel. The front and back (inlet and outlet) of the narrow exhaust gas paths 52 are connected to the exhaust pipe 12 and the front and back (inlet and outlet) of narrow hydrogen medium paths 51 are connected to the pipe 41 and the pipe 42.

It is desirable that the narrow hydrogen medium paths 51 in the first heat exchanger 3 should be parallel flow paths composed of multiple pipes, 1 mm$^2$ or less in sectional area. By constructing the narrow hydrogen medium paths 51 as parallel flow paths, a specific surface area of the heat exchanger is made larger than in a single flowpath and thus the heat exchanger can be reduced in size. Further, a stress applied to the structure by the pressurized liquid can be reduced.

A flow path resistance of each of the parallel flow paths often differs depending on a manufacturing error or the like. Without the back pressure valve 33, for this reason, the flow rate differs from flow path to flow path and this leads to the difference in boiling position from flow path to flow path. With the back pressure valve 33, meanwhile, the boiling position can be fixed and the shape of the narrow hydrogen medium paths 51 can be made appropriate. It is desirable that the narrow exhaust gas paths 52 should also be parallel flow paths. This makes it possible to increase a contact area with partition walls and enhance an efficiency of heat exchange with the narrow hydrogen medium paths 51.

The shape of the flow paths in the second heat exchanger 2 may be the same as in FIG. 2. Since the hydrogen medium in the second heat exchanger has been already depressurized, however, the shape of each narrow hydrogen medium path 51 need not be circular and may be rectangular like the narrow exhaust gas paths 52.

Since the hydrogen medium in the second heat exchanger 2 is gas, it has a lower fluid resistance than liquid and a low coefficient of thermal conductivity as well. For this reason, the following can be implemented even though the sectional area per flow path is made smaller than the narrow hydrogen medium path 51 in the first heat exchanger 3: it is possible to suppress increase in pressure loss and yet increase a coefficient of thermal conductivity. Therefore, the narrow hydrogen medium paths 51 may be smaller in the second heat exchanger 2 than in the first heat exchanger 3.

The back pressure valve 33 in this embodiment only has to be capable of maintaining the pressure on the upstream side of the back pressure valve 33. It may be so constructed that it is mechanically operated to maintain a set value or electronically controlled.

Second Embodiment

Figure 3:
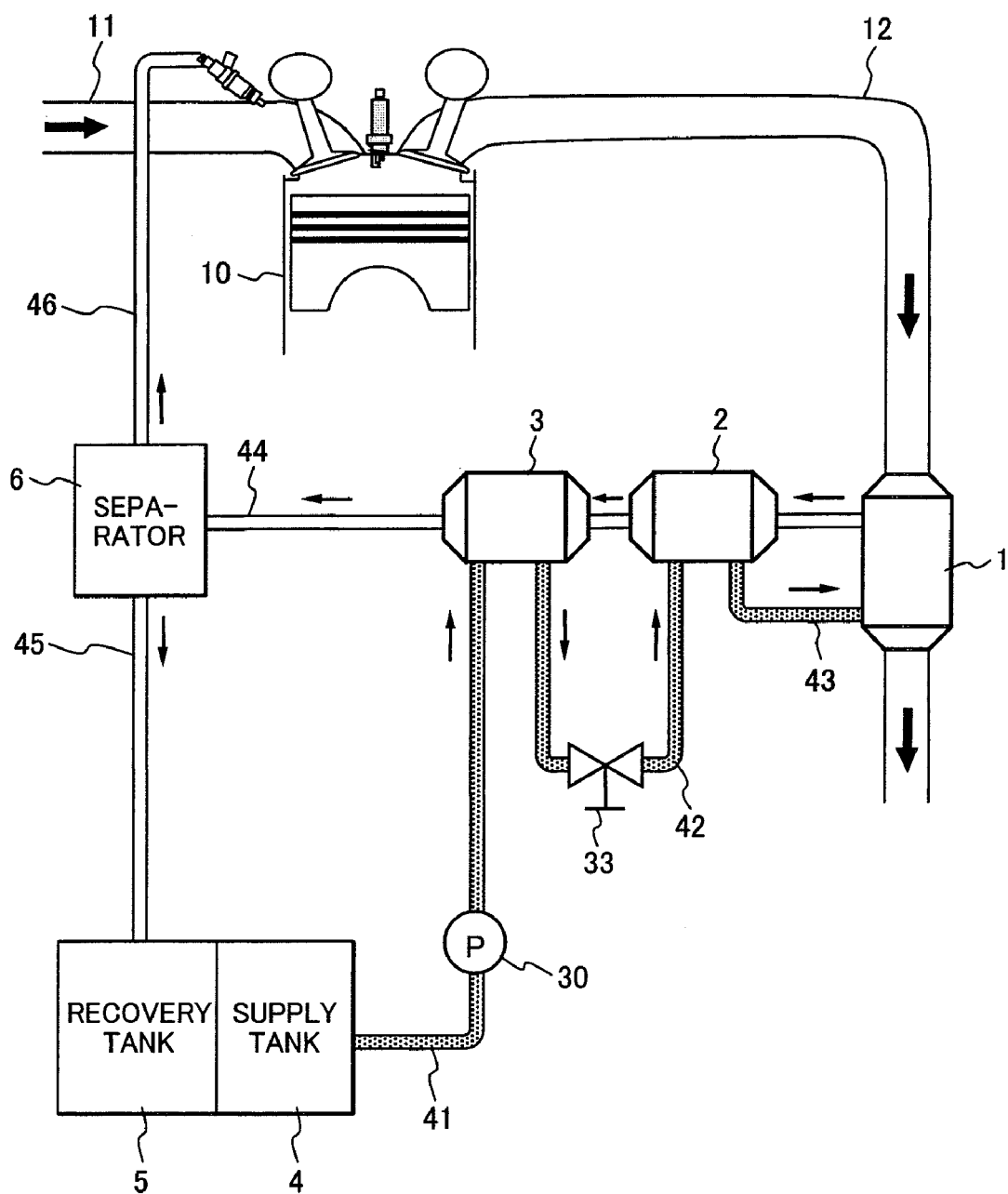
FIG. 3 is a schematic block diagram illustrating an engine system in another embodiment of the present invention.

FIG. 3 illustrates an engine system in another embodiment of the present invention. The engine system illustrated in the drawing includes the engine 10 that uses a hydrogen medium as fuel. The engine 10 is connected with the intake pipe 11 and the exhaust pipe 12 and the reactor vessel 1 is arranged in the exhaust pipe 12. The second heat exchanger 2 and the first heat exchanger 3 are arranged in the pipe 44 connecting gas produced at the reactor vessel 1 to the separator 6 in this order from an upstream side in the pipe 44.

A hydrogenated medium as a liquid fuel is pressurized by the pump 30 and is supplied from the supply tank 4 to the first heat exchanger 3 through the pipe 41. The hydrogenated medium is heated at the first heat exchanger 3 and then goes through the pipe 42, second heat exchanger 2, pipe 43, and reactor vessel 1. A part of it is thereby turned into a dehydrogenated medium and goes through the pipe 44 and arrives at the separator 6. In the pipe 42 connecting to the second heat exchanger 2, the back pressure valve 33 is arranged. The pipe 44 is a dehydrogenated medium flow path for transporting the dehydrogenated medium from the reactor vessel 1.

The pressure of the back pressure valve 33 is set to a value equal to or higher than the saturated vapor pressure of the liquid fuel. Therefore, the liquid fuel remains in a liquid state in the first heat exchanger 3 even though it is heated to a temperature equal to or higher than its boiling point. When the liquid fuel in a high-temperature and high-pressure passes through the back pressure valve 33, it is depressurized and turned into a fuel gas (a gas state). At this time, an evaporative latent heat is drawn and a temperature of the fuel gas reduces. The fuel gas with a reduced temperature is heated again at the second heat exchanger 2 and is supplied to the reactor vessel 1 through the pipe 43.

The fuel gas (the hydrogenated medium) is brought into contact with the catalyst heated by the exhaust gas supplied through the exhaust pipe 12 and brought into a high-temperature state in the reactor vessel 1. As a result, a part of the fuel gas is decomposed and turned into a hydrogen gas and a dehydrogenated medium.

A mixture of the hydrogenated medium, a hydrogen gas, and a dehydrogenated medium goes through the pipe 44 and exchanges heat with the hydrogenated medium supplied by the pump 30 at the second heat exchanger 2 and the first heat exchanger 3. It is thereby cooled and is separated into hydrogen as a gas and a fuel that is liquid at normal temperature at the separator 6. The separated liquid fuel goes through the pipe 45 and is reserved in the recovery tank 5. Meanwhile, the separated hydrogen goes through the pipe 46 and is supplied into the intake pipe 11 or the cylinder in the engine 10. Hydrogen burned in the engine 10 is turned into a high-temperature exhaust gas and is released to the air through the exhaust pipe 12.

As mentioned above, the present invention is so constructed that the hydrogen medium supplied to the reactor vessel 1 is preheated and is characterized in that it is comprised of two heat exchangers with a back pressure valve 33 in-between. Positions of arrangement of the heat exchangers are not limited to those in the above embodiments and they only have to be arranged in the pipe 44 or the exhaust pipe 12. When one heat exchanger is arranged in each of the pipe 44 and the exhaust pipe 12, the amount of recovered heat may be increased in some cases.

The position of arrangement of the heat exchanger in the exhaust pipe 12 is not limited to the downstream side of the reactor vessel 1. Instead, two heat exchangers may be arranged an upstream of the reactor vessel 1 or one heat exchanger may be respectively arranged the upstream and the downstream of the reactor vessel 1.

When the heat exchanger is arranged the upstream in the exhaust pipe 12, heat is exchanged with the high-temperature exhaust gas and thus the temperature of the exhaust gas supplied to the reactor vessel 1 is lowered. This makes it possible to control the temperature of the catalyst in the reactor vessel 1 so that it does not reach an upper-limit temperature of destroying the catalyst.

When the heat exchanger is arranged the downstream in the exhaust pipe 12, a waste heat that could not be recovered at the reactor vessel 1 is utilized and thus it is possible to increase an amount of a recovered heat of an entire engine system.

When the heat exchanger is arranged in the pipe 44, it is possible to recover the heat of the high-temperature fuel gas flowing through the pipe 44 and thus increase the amount of recovered heat of the entire engine system. In addition, a configuration for cooling the separator 6 can be omitted.

What is claimed is:

1. An engine system comprising:
   an engine having an intake pipe for taking in air for combustion thereinto and an exhaust pipe for exhausting a exhaust gas therefrom;
   a reactor vessel with a catalyst supported therein for decomposing a hydrogen medium which contains hydrogen in molecules thereof and of which the hydrogen can be taken out by a chemical reaction;
   a hydrogen medium tank storing the hydrogen medium;
   a high-pressure pump for pressurizing and transporting the hydrogen medium;
   a first heat exchanger for exchanging heat with the hydrogen medium in a liquid state;
   a second heat exchanger for exchanging heat with the hydrogen medium in a gas state; and
   a back pressure valve disposed in a hydrogen medium flow path between the first heat exchanger and the second heat exchanger and configured to depressurize the hydrogen medium passing through the back pressure valve from the first heat exchanger to the second heat exchanger to vaporize the hydrogen medium passing through the back pressure valve from the first heat exchanger to the second heat exchanger,
   wherein the reactor vessel is disposed in the exhaust pipe so that the reactor vessel can exchange heat with the exhaust pipe, and
   wherein the high-pressure pump, the first heat exchanger, and the second heat exchanger are arranged in the hydrogen medium flow path for transporting the hydrogen medium from the hydrogen medium tank to the reactor vessel in this order from an upstream side in the hydrogen medium flow path.

2. The engine system according to claim 1,
   wherein the first heat exchanger and the second heat exchanger are so constructed as to exchange heat between the hydrogen medium flow path and the exhaust pipe.

3. The engine system according to claim 2,
   wherein the reactor vessel, the second heat exchanger, and the first heat exchanger are arranged in the exhaust pipe in this order from an upstream side in the exhaust pipe.

4. The engine system according to claim 2,
   wherein the first heat exchanger and/or the second heat exchanger disposed in the exhaust pipe is arranged in an upstream side of the reactor vessel disposed in the exhaust pipe.

5. The engine system according to claim 1,
   wherein the first heat exchanger and the second heat exchanger are so constructed as to exchange heat between the hydrogen medium flow path and a dehydrogenated medium flow path for transporting a dehydrogenated medium from the reactor vessel.

6. The engine system according to claim 5,
   wherein the second heat exchanger and the first heat exchanger are arranged in the dehydrogenated medium flow path in this order from an upstream side in the dehydrogenated medium flow path.

7. The engine system according to claim 5,
   wherein either of the first heat exchanger and the second heat exchanger is so constructed as to exchange heat between the hydrogen medium flow path and the exhaust pipe and the other is so constructed as to exchange heat between the hydrogen medium flow path and the dehydrogenated medium flow path.

8. The engine system according to claim 5,
   wherein the first heat exchanger is so constructed as to exchange heat between the hydrogen medium flow path and the dehydrogenated medium flow path and the second heat exchanger is so constructed as to exchange heat between the hydrogen medium flow path and the exhaust pipe.

9. The engine system according to claim 5,
   wherein the first heat exchanger is so constructed as to exchange heat between the hydrogen medium flow path and the exhaust pipe and the second heat exchanger is so constructed as to exchange heat between the hydrogen medium flow path and the dehydrogenated medium flow path.

10. The engine system according to claim 1,
    wherein at least one heat exchanger selected from a group of a plurality of heat exchangers including the first heat exchanger and the second heat exchanger contains a plurality of narrow hydrogen medium paths therein and the narrow hydrogen medium paths are disposed in parallel.

11. The engine system according to claim 1,
    wherein at least one heat exchanger selected from a group of a plurality of heat exchangers including the first heat exchanger and the second heat exchanger contains a plurality of narrow exhaust gas paths therein and the narrow exhaust gas paths are disposed in parallel.

12. The engine system according to claim 10,
    wherein a sectional area of one of the plurality of narrow hydrogen medium paths in the first heat exchanger is larger than a sectional area of one of the plurality of hydrogen medium flow paths in the second heat exchanger.

13. The engine system according to claim 10,
    wherein the sectional area of one of the plurality of narrow hydrogen medium paths in the first heat exchanger is 1 mm$^2$ or less.

14. The engine system according to claim 1,
    wherein a pressure at which the back pressure valve opens has a value higher by 10% or more than a saturated vapor pressure of the hydrogen medium at a target temperature.

15. The engine system according to claim 14, further comprising:
    a separator provided at a downstream side of the reactor vessel and an upstream side of the engine configured to separate hydrogen from the hydrogen medium and dehydrogenated medium from the reactor; and
    a hydrogen flow path supplying the hydrogen from the separator to the engine.

16. The engine system according to claim 15, further comprising:
    a recovery tank at a downstream side of the store the hydrogen medium and the dehydrogenated medium separated from the hydrogen in the separator.

17. The engine system according to claim 1,
wherein a pressure at which the back pressure valve opens has a value higher by 50% or more than a saturated vapor pressure of the hydrogen medium at a target temperature.

18. The engine system according to claim 1,
wherein a pressure at which the back pressure valve opens has a value higher than a saturated vapor pressure of the hydrogen medium at a target temperature.

19. The engine system according to claim 1, further comprising:

a separator provided at a downstream side of the reactor vessel and an upstream side of the engine configured to separate hydrogen from the hydrogen medium and dehydrogenated medium from the reactor; and a hydrogen flow path supplying the hydrogen from the separator to the engine.

20. The engine system according to claim 19, further comprising:

a recovery tank at a downstream side of the store the hydrogen medium and the dehydrogenated medium separated from the hydrogen in the separator.

* * * * *